(12) United States Patent
Rencurosi

(10) Patent No.: US 12,459,969 B2
(45) Date of Patent: Nov. 4, 2025

(54) PROCESS FOR THE PREPARATION OF TRENBOLONE AND/OR TRENBOLONE ACETATE

(71) Applicant: F.I.S.—FABBRICA ITALIANA SINTETICI S.P.A., Montecchio Maggiore Vicenza (IT)

(72) Inventor: Anna Rencurosi, Montecchio Maggiore Vicenza (IT)

(73) Assignee: F.I.S.—FABBRICA ITALIANA SINTETICI S.P.A., Montecchio Maggiore Vicenza (IT)

( * ) Notice: Subject to any disclaimer, the term of this patent is extended or adjusted under 35 U.S.C. 154(b) by 446 days.

(21) Appl. No.: 18/253,339

(22) PCT Filed: Nov. 18, 2021

(86) PCT No.: PCT/EP2021/082209
§ 371 (c)(1),
(2) Date: May 17, 2023

(87) PCT Pub. No.: WO2022/106574
PCT Pub. Date: May 27, 2022

(65) Prior Publication Data
US 2024/0025941 A1    Jan. 25, 2024

(30) Foreign Application Priority Data

Nov. 19, 2020 (EP) .................................... 20208607
Nov. 19, 2020 (EP) .................................... 20208625
Mar. 19, 2021 (EP) .................................... 21163673

(51) Int. Cl.
*C07J 1/00* (2006.01)
(52) U.S. Cl.
CPC ............... *C07J 1/0074* (2013.01); *C07J 1/00* (2013.01)
(58) Field of Classification Search
CPC .................................................... C07J 1/0074
See application file for complete search history.

(56) References Cited

U.S. PATENT DOCUMENTS

2004/0258589 A1    12/2004    Golovanoff

FOREIGN PATENT DOCUMENTS

| CN | 102399253 A | 4/2012 |
| CN | 102924553 A | 2/2013 |
| CN | 108017682 A | 5/2018 |
| CN | 110437294 A | 11/2019 |
| FR | 2745291 | * 6/1997 |
| FR | 2745291 A1 | 8/1997 |
| GB | 1035683 A | 7/1966 |
| WO | 9930685 A1 | 6/1999 |
| WO | 9947073 A1 | 9/1999 |
| WO | 2000025743 A2 | 5/2000 |
| WO | 2001043748 A2 | 6/2001 |
| WO | 2001043749 A2 | 6/2001 |
| WO | 2007106768 A2 | 9/2007 |
| WO | 2019217203 A1 | 11/2019 |
| WO | 2020061550 A1 | 3/2020 |

OTHER PUBLICATIONS

Hu-yue Zhang, et al., "Synthesis of Trenbolone Acetate in High Yield", Fudan Univ J. Med Sci, vol. 29, No. 3, pp. 211-212, 2002.
H. J. Ringold, et al., "Kinetic and Thermodynamic Control of Quinone Dehydrogenations", Chemistry and Industry, pp. 211-212, 1962.
International Search Report and Written Opinion for Corresponding International Application No. PCT/EP2021/082209 (9 Pages) (Feb. 28, 2022).
International Search Report and Written Opinion for Corresponding International Application No. PCT/EP2021/082199 (14 Pages) (Feb. 8, 2022).

* cited by examiner

*Primary Examiner* — Brandon J Fetterolf
(74) *Attorney, Agent, or Firm* — LUCAS & MERCANTI, LLP

(57) ABSTRACT

Object of the present invention is an improved process for the preparation of Trenbolone (I-b) and/or Trenbolone Acetate (I-a) comprising the reaction of the compound of formula (II): wherein R is H or Ac; with an oxidant agent in presence of an acid.

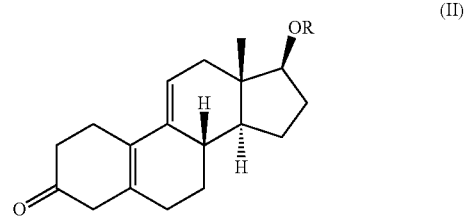

13 Claims, No Drawings

PROCESS FOR THE PREPARATION OF TRENBOLONE AND/OR TRENBOLONE ACETATE

CROSS-REFERENCE TO RELATED APPLICATIONS

This application is a 371 of PCT/EP2021/082209, filed Nov. 18, 2021, which claims the benefit of European Patent Application No. 20208607.0, filed Nov. 19, 2020, European Patent Application No. 20208625.2, filed Nov. 19, 2020 and European Patent Application No. 21163673.3, filed Mar. 19, 2021.

TECHNICAL FIELD

The present invention refers to an improved process for the preparation of Trenbolone and/or Trenbolone Acetate.

BACKGROUND ART

Trenbolone Acetate is a small molecule, sold under brand names such as Finajet and Finaplix among others, is an androgen and anabolic steroid (AAS) medication which is used in veterinary medicine, specifically to increase the profitability of livestock by promoting muscle growth in cattle.

The drug is a synthetic androgen and anabolic steroid and hence is an agonist of the androgen receptor (AR), the biological target of androgens like testosterone and dihydrotestosterone (DHT). It has strong anabolic effects and highly androgenic effects, as well as potent progestogenic effects, and weak glucocorticoid effects. Trenbolone acetate is an androgen ester and a long-lasting prodrug of trenbolone in the body.

Trenbolone acetate was discovered in 1963 and was introduced for veterinary use in the early 1970s.

Trenbolone acetate is a synthetic estrane steroid and a derivative of nandrolone (19-nortestosterone). It is the C17β acetate ester of trenbolone, which itself is δ9,11-19-nortestosterone (δ9,11-19-NT) or estra-4,9,11-trien-17β-ol-3-one. Other trenbolone esters include trenbolone enanthate, trenbolone hexahydrobenzylcarbonate, and trenbolone undecanoate.

Tronbolone acetate has the following chemical formula (I-a):

(I-a)

and chemical name is 17beta-acetoxy-estra-4,9,11-triene-3-one.

The described synthetic route of Trenbolone Acetate is long, and some reaction yield is very low.

Zhang et al. (in Fudan Xuebao, Yixueban 2002, 29(3), 211-212) discloses a preparation method of trenbolone acetate. The method comprises the following steps: taking estra-4,9-dien-3,17-dione (VI) as a starting raw material, carrying out protection on carbonyl group in the 3-position with methanol and p-toluenesulfonic acid as catalyst, afterwards the carbonyl group in the 17-position is reduced to hydroxy group with sodium bore hydride. The obtained product (IV) is deprotect in acid condition to restore the carbonyl group in 3-position. The obtained (17β)-17-Hydroxyestra-5,9-dien-3-one (II-b) is converted thus to the Trenbolone (I-b) by oxidation with 2,3-Dichloro-5,6-dicyano-1,4-benzoquinone (DDQ). In the last step is carry out the esterification reaction on the hydroxyl group in 17-position of Trenbolone by acetic anhydride to obtain Trenbolone acetate (I-a), wherein the specific route is as follows:

-continued

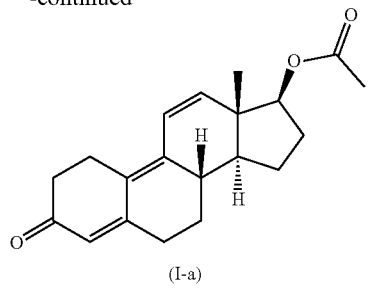

(I-a)

The described route has many and long steps and multiple byproducts, solid products cannot be obtained, the quality is low, the yield is low, high-toxicity solvent benzene is needed, and industrial production is not facilitated.

According to the route disclosed by the Chinese patent CN102399253, (17β)-17-Hydroxyestra-4,9-dien-3-one (VII) is used as a raw material. Diacetyl enol ester (VIII) was obtained by acetiletation with acetyl chloride and acetic anhydride. Afterwards an hydrolysis of acetyl group in position 3 and an oxidative dehydrogenation are carried out to obtain the Trenbolone acetate, and the specific route is as follows:

The route is firstly subjected to 17-position hydroxyl esterification, the next enol-esterification of the carbonyl group in 3 position is difficult and has a low conversion. The successive selective hydrolysis of the enol ester in 3 position is difficult, excessive hydrolysis of the acetyl group in 17-position is easy to occur. The purification of obtained intermediate (II-a) is difficult, and the scaling up of the process is difficult.

The route of the Chinese patent CN102924553 describes a optimized process of Zhang et al. wherein the acidic catalyst in the protection of carbonyl group in 3-position is changed from p-toluenesulfonic acid to acetyl chloride/methanol. This route uses a large amount of acidic reagent i.e. acetyl chloride, which implies large corrosion, the requirement on the production equipment is high, for which corrosion resistant equipment is required. Consequently, the waste amount is large, and the total yield is not significatilvely improved.

The route disclosed by the Chinese patent CN108017682 start from a compound which has a 4,9 open rings. Through a reduction with potassium borehydride, and a subsequent acid-catalyzed condensation, the (17β)-17-Hydroxyestra-5,9-dien-3-one (II-b) is obtained. The next oxidative dehydrogenation with DDQ and the esterification, the Trenbolone acetate is obtained, and the specific route is as follows:

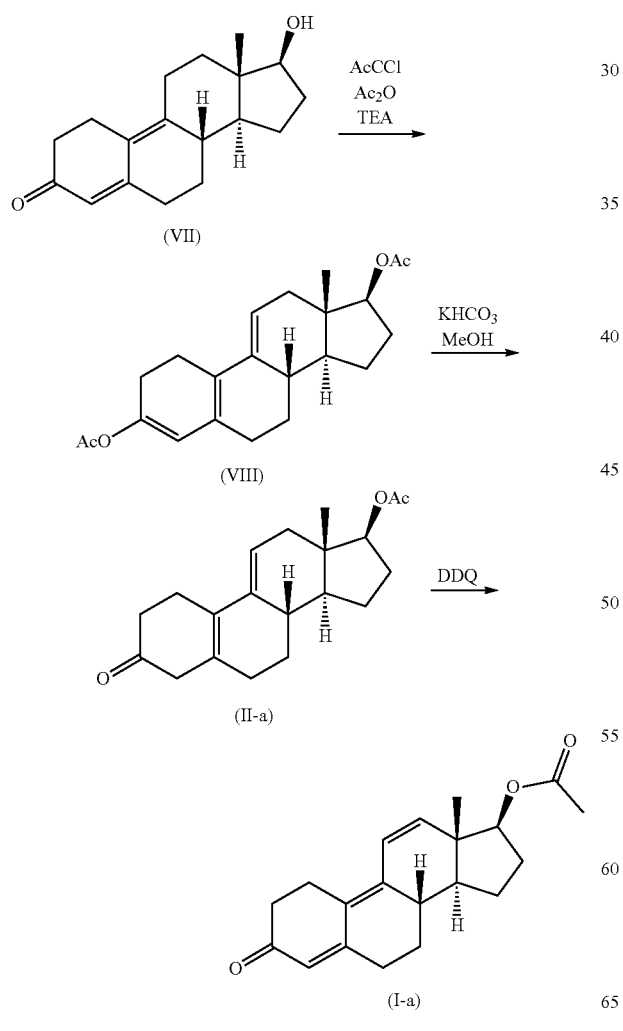

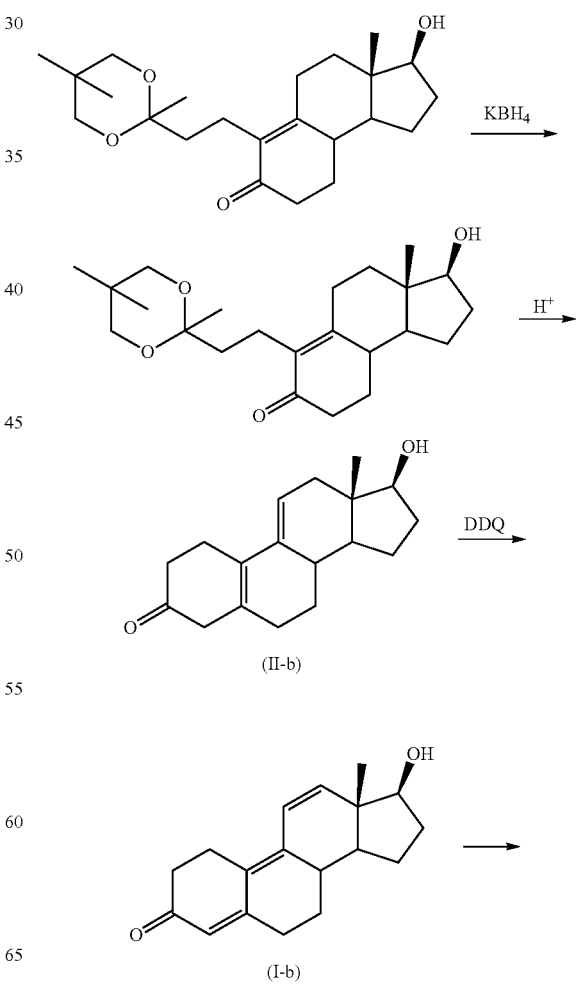

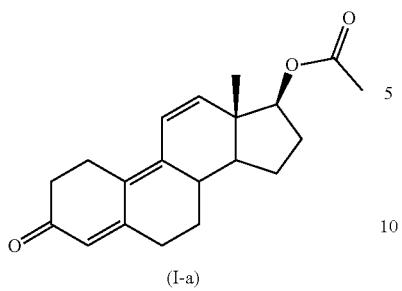

(I-a)

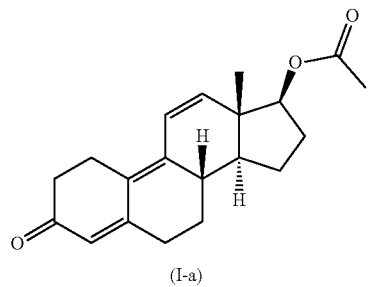

(I-a)

The potassium-boron hydrogen reduction is unselective and difficult to control; moreover the acid-catalyzed ring closing condensation has a low yield. Finally, the intermediates and the product require a purification because have a poor quality.

The route disclosed by the Chinese patent CN110437294 is very similar to the route disclosed by Zhang et al. (in Fudan Xuebao, Yixueban 2002, 29(3), 211-212). The differences between the two ways lie in the protector group used to protect the carbonyl group in position 3, from a methanol acetal to a ethylenedioxy acetal.

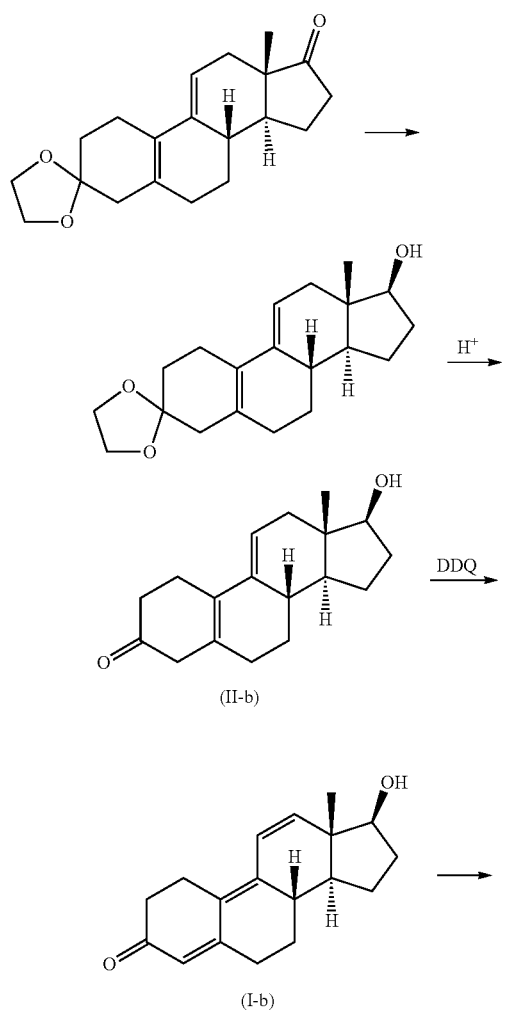

Furthermore, the prior art methods have the drawbacks related to the poor reproducibility of the process.

These prior art methods for the preparation of Trenbolone and/or Trenbolone Acetate do not describe a preparation method comprising the use of acid for the oxidation reaction.

Thus, there is a need for a process for preparing the Trenbolone and/or Trenbolone Acetate with high yield and quality.

SUMMARY OF INVENTION

The problem addressed by the present invention is therefore that of providing a better process for preparing of Trenbolone and/or Trenbolone Acetate, which allows to get round to the drawbacks above reported with reference to the known prior art.

This problem is solved by a process for the synthesis of Trenbolone and/or Trenbolone Acetate as outlined in the annexed claims, whose definitions are integral part of the present description.

Further features and advantages of the processes according to the invention will result from the description hereafter reported of examples of realization of the invention, provided as an indication of the invention.

DESCRIPTION OF EMBODIMENTS

Object of the present invention is a process for the preparation of Trenbolone (I-b) and/or Trenbolone Acetate (I-a) comprising the reaction of the compound of formula (II):

(II)

wherein R is H or Ac;
in an organic solvent with an oxidant agent, characterized in that the reaction is performed in presence of an acid.

The present invention is related to a process for the preparation of compound of formula (I):

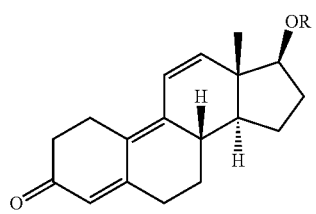

wherein R is H or Ac;
comprising the reaction of compound of formula (II):

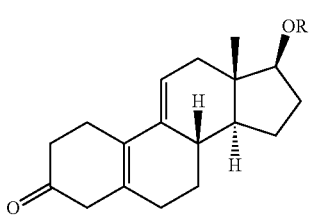

wherein R is H or Ac;
with a oxidant agent in an organic solvent, characterized in that the reaction is performed in presence of a acid selected from a carboxylic acid, inorganic acid, sulphonic acid.

According to a preferred embodiment of the process of the present invention, the acid is acetic acid or trifluoroacetic acid.

According to a preferred embodiment, the process of the present invention is carried out with an amount of acetic acid or trifluoroacetic acid which is comprised between 0.5 and 1.5 molecular equivalents, more preferably about 1 molecular equivalent.

It has been indeed surprisingly found that said acid addition allow the preparation of the compound (I) with excellent yield, and/or with very high conversions.

Volumes means volume of solvent per unit of product being the weight of starting material of the step. Thus, for example, 1 volume is 1 Liter per 1 Kilo, or 1 mL for 1 gram, or 1 microliter per 1 milligram. Thus, 10 volumes means for example 10 microliters per 1 milligram of substance.

The organic solvent of the process of the present invention can be an hydrocarbon solvent, a chlorinated solvent, acetate solvent, nitriles, etc.

An example of hydrocarbon solvent is Toluene, while examples of chlorinated solvents are chloroform, methylene chloride (DCM), chlorobenzene, etc. and examples of acetates are isopropyl acetate or ethyl acetate, while an example of nitrile solvent is acetonitrile.

According to a preferred embodiment, the process of the present invention is carried out using methylene chloride as organic solvent.

According to a preferred embodiment of the process of the present invention, the amount of methylene chloride is comprised between 5 and 15 volumes, more preferably about 10 volumes.

According to a more preferred embodiment, the process of the present invention is carried out with an amount of acetic acid or trifluoroacetic acid which is comprised from 0.5 to 1.5 molecular equivalents and the amount of organic solvent is comprised from 5 to 15 volumes, again more preferably, an amount of acetic acid or trifluoroacetic acid is about 1 molecular equivalent and the amount of organic solvent is about 10 volumes.

According to a more preferred embodiment, the process of the present invention is carried out with an amount of acetic acid or trifluoroacetic acid which is about 1 molecular equivalent and the amount of organic solvent is about 10 volumes.

According to a preferred embodiment of the process of the present invention, the reaction is performed at a temperature comprised in the range from −10° C. to 10° C., more preferably between −5° C. and 5° C., or at about 0° C.

According to a preferred embodiment of the process of the present invention, the amount of oxidizing agent is comprised in the range from 0.5 to 1.5 molecular equivalents, preferably from 1 to 1.2 mol. equivalents, again more preferably, about 1.1 mol. equivalents.

According to a preferred embodiment of the process of the present invention, the oxidizing agent is 2,3-Dichloro-5,6-dicyano-1,4-benzoquinone since it is the oxidizing agent that provides the best impurity profile.

According to a preferred embodiment of the process of the present invention, the amount of acetic acid or trifluoroacetic acid is comprise in the range from 0.8 and 1.2 molecular equivalents and the amount of 2,3-Dichloro-5,6-dicyano-1,4-benzoquinone is comprise in the range from 1 and 1.2 molecular equivalents.

The molar yield of the process according to the present invention is comprised between 70% and 90% if the process started from the compound (II), being typically about 75-85%.

The molar yield of the process according to the present invention is comprised between 60% and 75% if the process started from the compound 9(10)-Dehydronandrolone (DHN), and the specific route is as follows:

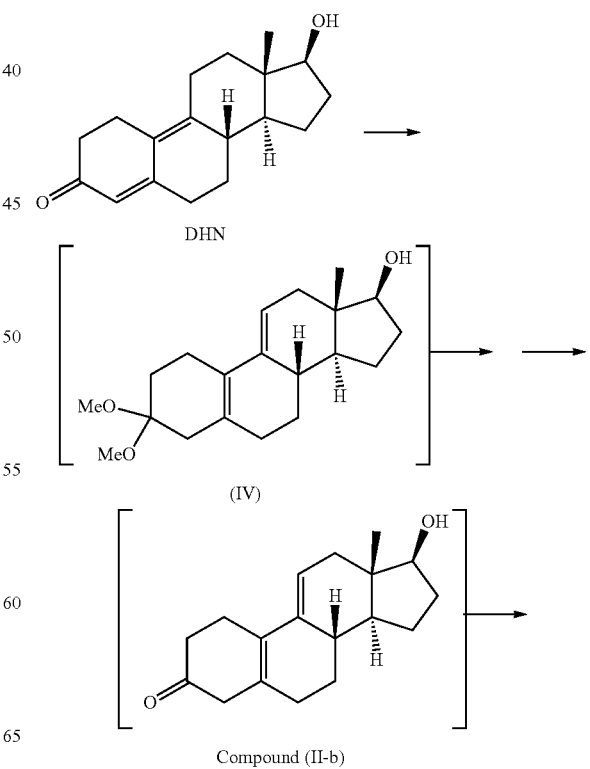

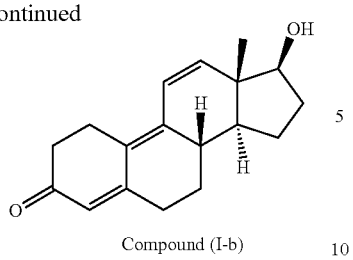

Compound (I-b)

The molar yield of the process according to the present invention is typically comprised between 65% and 70% if the process started from DHN.

In another embodiment of the invention, the intermediates and compounds of the present invention in particular those of formula (IV), (I) and (II) can be in isolated or in not isolated form, from the reaction mixture wherein they are prepared.

According to the preferred embodiment, all of the intermediates and compounds isolated are typically in form of a solid or of an isolated oil.

According to the preferred embodiment, all of the intermediates and compounds not isolated are typically in form of solution with an organic solvent or water.

Furthermore, it has been indeed surprisingly found that the said acid addition allow the preparation of the compound (I) with the almost complete conversion of the compound of formula (II) to the compound of formula (I), and with robust reproducibility of the results.

On the contrary, the absence of acid inhibits the conversion of the compound of formula (II) to the compound of formulas (I), also decreases the yield and increases the formation of impurities.

Performing the reaction in presence of acid, avoids the need to use a large excess of oxydizing agent. Thus, using acetic acid or trifluoroacetic acid as acid to perform the oxidation reaction, it is achieved the advantage of reducing the amount of oxydizing agent employed.

According to the prior art, the amount of oxydizing agent used is more than 1.2 molar equivalent, preferred more than 1.3 molar; on the contrary, in the process of the invention the quantity of the oxidant is preferably at most 1.2 molar equivalents.

According to a preferred embodiment of the process of the present invention, the reaction is carried out under anhydrous conditions.

According to a preferred embodiment of the process of the present invention, the reaction is carried out under anhydrous conditions. It has been indeed found that the presence of moisture or water is detrimental for the oxidation reaction since the presence of water provide the products containing more impurities and lower conversion.

According to a preferred embodiment of the process of the present invention the amount of water should be lower than 2000 ppm in the oxidation reaction mixture to guarantee that the amount of impurities are lower than 0.10% in the final product.

According to a more preferred embodiment of the process of the present invention the amount of water should be lower than 1000 ppm in the oxidation reaction mixture.

The process of the present invention can further comprise the step of preparation of the compound of formula (I-a):

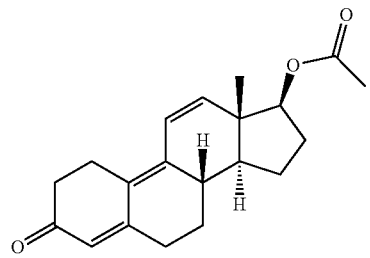

by acetylation of the compound of formula (I), wherein R is H, i.e. the compound of formula (I-b):

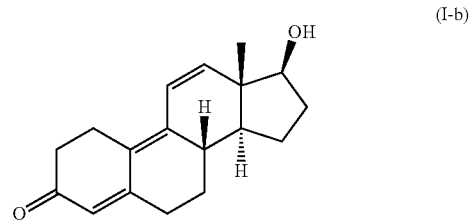

The acetylation reaction of the compound of formula (I-b) is typically carried out in an organic solvent in presence of acetic anhydride and a catalyst.

Specifically, the process of the invention can be carried out one-pot, i.e. starting from step of oxidizing and continuing to step of acetylation, thus producing a Trenbolone Acetate of formula (I-a), keeping the compound Trenbolone of formula (I-b) obtained in step of oxidizing in a solution, i.e. without isolating it in a solid form.

According to a preferred embodiment of the process of the invention, the step of acetylation and the step of oxidizing are carried out in a one-pot.

In particular, at the end of the oxidation reaction, acetyc anhydride can be added to the reaction mixture thus carrying out the whole process one-pot.

The process of the present invention can be carried out with anyone of the combinations of preferred embodiments above described.

The acid can be used to carried out the oxidation reaction of the compound of formula (II):

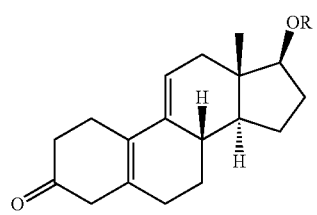

wherein R is H or Ac;
to provide the compound of formula (I):

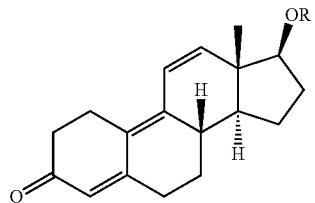

wherein R is H or Ac.

According to a preferred embodiment, the acetic acid or trifluoroacetic acid; can be used to carried out the oxidation reaction of the compound of formula (II):

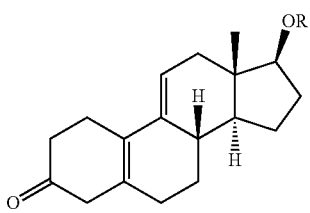

wherein R is H or Ac;
to provide the compound of formula (I):

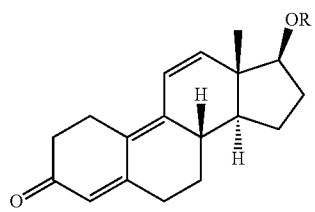

wherein R is H or Ac.

According to a preferred embodiment, the acetic acid or trifluoroacetic acid; can be used for the preparation the compound of formula (I):

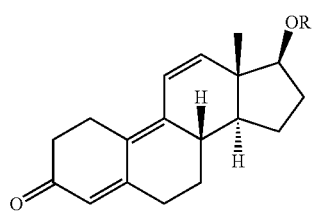

wherein R is H or Ac.

Acetic acid or trifluoroacetic acid can therefore be conveniently used to carry out the oxydation reaction with a oxydizing agent of the the compound of formula (II):

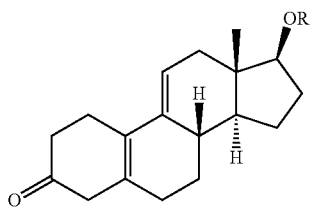

wherein R is H or Ac; to provide the compound of formula (I):

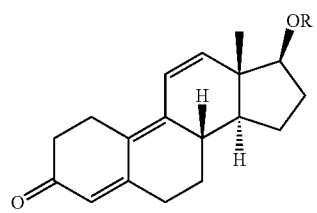

wherein R is H or Ac.

Moreover, in another aspect of the present invention is a process for the preparation of the compound of formula (XIV):

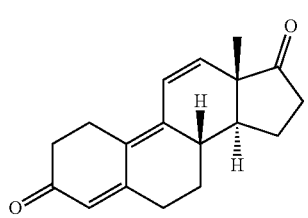

comprising the reaction of the compound of formula (XV):

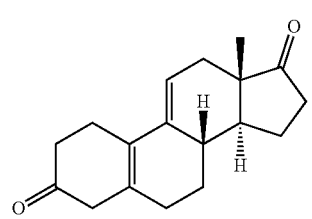

in an organic solvent with an oxidant agent, characterized in that the reaction is performed in presence of an acid.

According to the preferred embodiment, the process of the present invention is related to a process for the preparation of compound of formula (XIV), comprising the reaction of compound of formula (II) with a oxidant agent in an organic solvent, characterized in that the reaction is performed in presence of a acid selected from a carboxylic acid, inorganic acid, sulphonic acid.

According to a preferred embodiment, the acetic acid or trifluoroacetic acid; can be used to carried out the oxidation reaction of the compound of formula (XV) to provide the compound of formula (XIV).

All the features and preferred embodiments of the process of the present invention given above can be combined in each possible combination to carry out the claimed process.

The skilled in the art of organic chemistry can appreciate as the process of the invention allows an improvement of the productivity considering the increasing of yield and/or conversions.

In one embodiment of the present invention, Trenbolone of formula (I-b) and/or Trenbolone Acetate of formula (I-a), prepared according to the above process, may be included in pharmaceutical compositions, comprising one or more pharmaceutically acceptable excipients or in combination with other active pharmaceutical ingredients and one or more pharmaceutically acceptable excipients.

EXPERIMENTAL SECTION

The starting material Trenbolone and Trenbolone Acetate can be prepared according to well-known prior art methods, or for example, as described in the CN 108017682, CN 102399253, CN 102924553 or in CN 110437294 or can be purchased on the market.

Suspension means a solid material suspended in a solvent or solution, i.e. mixture of a solid with a solvent, which is liquid. The solvent also contains other compound or a solid.

Room temperature (RT) means a temperature that is comprised in a range of value from 20° C. to 25° C., it is a comfortable temperature range indoors.

Molar equivalent means that the molar amount of a substance reacts with a molar amount of another substance in a given chemical reaction.

Example 1: Preparation of Compound of Formula (I) Wherein R is H (i.e. Compound (1-b), Trenbolone), Starting from Compound of Formula (II) Wherein R is H (i.e. Compound (II-b)), with Acetic Acid

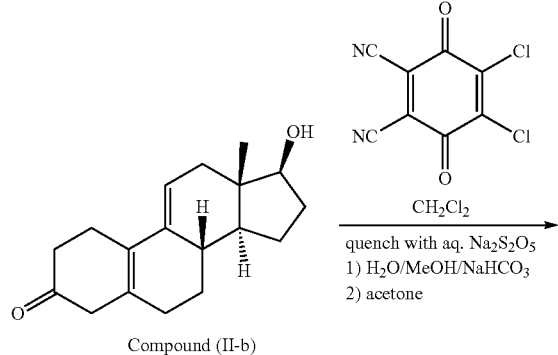

Compound (II-b)

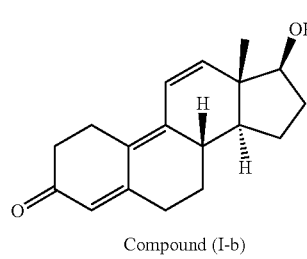

Compound (I-b)

To a cold mixture of 47.9 g 2,3-Dichloro-5,6-dicyano-1,4-benzoquinone (DDQ) in 375 mL anhydrous methylene chloride (DCM), a solution of 54.9 g compound (II-a) and 11.5 mL acetic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of $Na_2S_2O_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of $NaHCO_3$. The phases are separated, and the organic layer washed one final time with a solution of 100 mL water, 10 mL MeOH and 3.9 g of $NaHCO_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated 3 times. The resulting suspension is cooled to 0° C. and kept at this temperature for 0.5 h with stirring, after which it is filtered, and the filter cake is washed twice with 50 mL cold acetone. The wet solid is dried at 40° C. under vacuum to give Trenbolone in 76% yield and 98.2% A/A purity by HPLC.

Example 2: Preparation of Compound of Formula (I) Wherein R is H (i.e. Compound (1-b), Trenbolone), Starting from Compound of Formula (II) Wherein R is H (i.e. Compound (II-b)), with Trifluoroacetic Acid

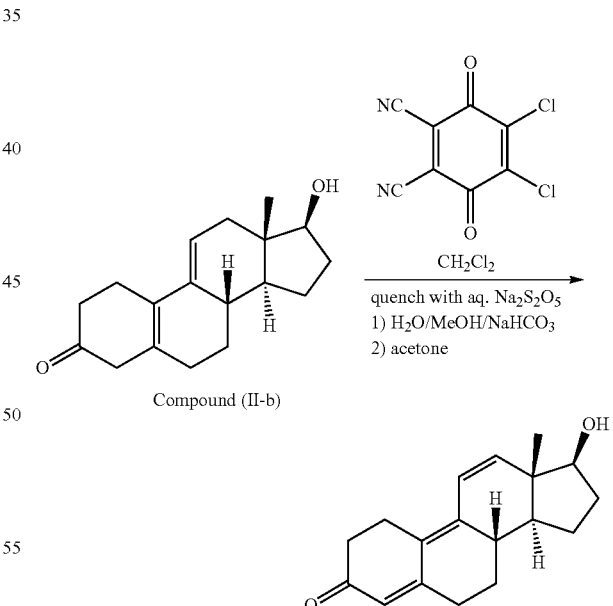

To a cold mixture of 47.9 g DDQ in 375 mL anhydrous DCM, a solution of 54.9 g compound (II-a) and 15.42 mL trifluoroacetic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of Na$_2$S$_2$O$_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of NaHCO$_3$. The phases are separated, and the organic layer washed one final time with a solution of 100 mL water, 10 mL MeOH and 3.9 g of NaHCO$_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated 3 times. The resulting suspension is cooled to 0° C. and stirring at this temperature for 0.5 h, after which it is filtered, and the filter cake is washed twice with 50 mL cold acetone. The wet solid is dried at 40° C. under vacuum to give Trenbolone in 80% yield and 99.3% A/A purity by HPLC.

Example 3: Preparation of Compound of Formula (I) Wherein R is H (i.e. Compound (1-b), Trenbolone), Starting from Compound of Formula (II) Wherein R is H (i.e. Compound (II-b)), with Methanesulfonic Acid

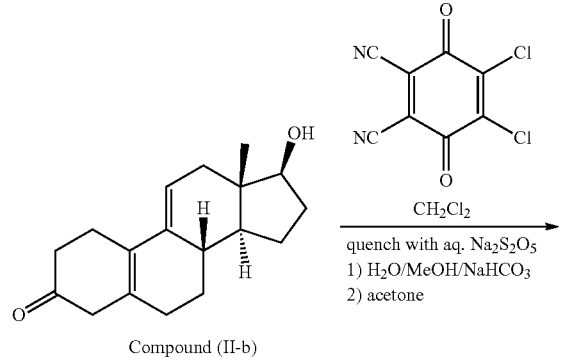

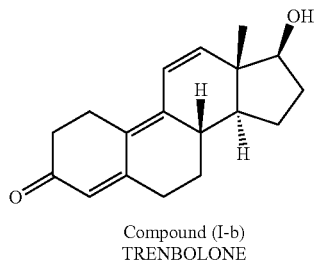

Compound (I-b)
TRENBOLONE

To a cold mixture of 47.9 g DDQ in 375 mL anhydrous DCM, a solution of 54.9 g compound (II-a) and 13 mL methanesulfonic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of Na$_2$S$_2$O$_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of NaHCO$_3$. The phases are separated, and the organic layer washed one final time with a solution of 100 mL water, 10 mL MeOH and 3.9 g of NaHCO$_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated until residual DCM is below 2% w/w by GC analysis. The resulting suspension is cooled to 0° C. and kept at this temperature for 0.5 h with stirring, after which it is filtered, and the filter cake is washed twice with 50 mL cold acetone. The wet solid is dried at 40° C. under vacuum to give Trenbolone in 70% yield and 98.0% A/A purity by HPLC.

Example 4: Preparation of Compound of Formula (I-b), Starting from 9(10)-Dehydronandrolone (DHN), with Acetic Acid

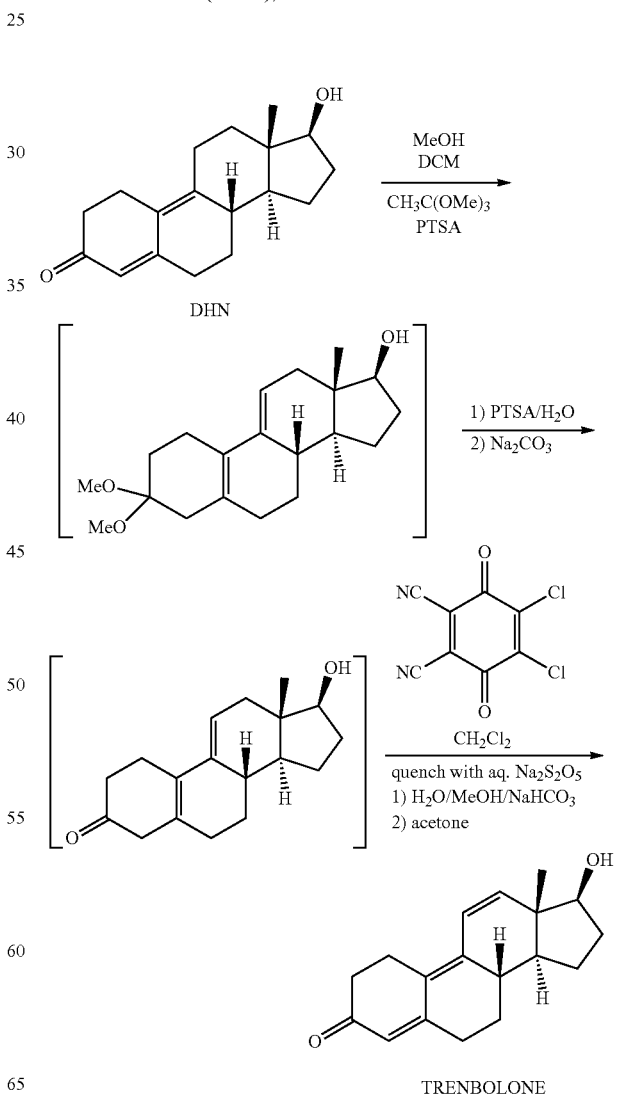

TRENBOLONE

To a solution of 100 g DHN in 250 mL DCM, 50 mL MeOH and 1.4 g of PTSA is added dropwise over the course of at least 2 h to a stirred solution of 100 mL DCM, 350 mL MeOH and 60.7 mL trimethyl orthoacetate. At the end of the addition, the addition funnel is rinsed with 33.3 mL DCM and the rinse transferred into the reaction mixture. After IPC analysis showing reaction completion, to the mixture was added 500 mL of water and left stirring for 0.5-2 h. The aqueous phase is discarded and to the organic phase is added a mixture of 400 mL water and 5 g PTSA. After IPC analysis showing reaction completion, the biphasic mixture is separated, and the organic phase is neutralized by addition under stirring at r.t. of a solution of water (100 mL) and NaHCO$_3$ (0.2 g), which brings the pH at 7-8. The phases are separated, and to the organic phase are added 200 mL DCM. The obtained solution is concentrated under vacuum to around 200 mL (total volume) by keeping the internal temperature below 30° C. This addition/concentration protocol is repeated until the solution is anhydrous. After reaching this limit, the mixture is evaporated one last time until the total volume reaches 300 mL. The mixture is treated with 24.1 mL of acetic acid and added dropwise to a stirred suspension of 95.8 g DDQ in 700 mL DCM, maintaining the internal temperature between 0-7° C. After the end of the addition, the addition vessel is rinsed with 50 mL DCM and the rinse is combined with the reaction mixture, which is left stirring at 0-7° C. until reaching complete conversion by HPLC. The reaction mixture is quenched by addition at 0-7° C. of a solution composed of 38.2 g of aqueous Na$_2$S$_2$O$_5$ (30% by weight), 73 mL water and 20 mL MeOH. The obtained slurry is warmed to r.t., left stirring for 0.5 h after which it is filtered, and the filter cake is washed with 2×100 mL DCM. The obtained biphasic mixture is separated, and the organic phase washed with a solution of 200 mL water, 20 mL MeOH and 7.7 g of NaHCO$_3$. After phase separation, the organic layer is washed again with a solution of 200 mL water, 60 mL MeOH and 7.7 g of NaHCO$_3$. The phases are separated, and the organic layer washed one final time with a solution of 200 mL water, 100 mL MeOH and 7.7 g NaHCO$_3$. The combined, filtered solution is concentrated with stirring to 300 mL (total volume) under vacuum, keeping the internal temperature below 30° C. To the resulting solution, 300 mL of acetone are added, and the obtained mixture concentrated under vacuum to 300 mL (total volume) again, keeping the internal temperature below 30° C. The resulting suspension is cooled to 0° C. and kept at this temperature for 0.5 h with stirring, after which it is filtered, and the filter cake is washed twice with 100 mL acetone. The wet solid is dried at 40° C. max under vacuum to give Trenbolone in 65% yield and >99.0% A/A purity by HPLC.

Ten experiments have been carried out keeping constant the substrate concentration, temperature, acid type, and solvent according to the conditions of the Example 4, as well as any other parameter/variable.

TABLE 1

| Comparison of the condition, with same acid: | | | |
|---|---|---|---|
| Trial | Eq DDQ | Eq AcOH | T (°) | Resa % |
| 1 | 1.1 | 1.15 | 0-5 | 68 |
| 2 | 1 | 1.15 | 5 | 62 |
| 3 | 1 | 0.8 | 5 | 64 |
| 4 | 1 | 1.2 | 8-10 | 61 |
| 5 | 1.1 | 1 | 0-7 | 61 |
| 6 | 0.5 | 1 | 5 | 50 |

TABLE 1-continued

| Comparison of the condition, with same acid: | | | |
|---|---|---|---|
| Trial | Eq DDQ | Eq AcOH | T (°) | Resa % |
| 7 | 1.15 | 1 | 5 | 67 |
| 8 | 1 | 1 | 5 | 69 |
| 9 | 1.2 | 1.5 | 5 | 60 |
| 10 | 1.1 | 2 | 5 | 64 |

Example 5: Preparation of Compound of Formula (I) Wherein R is H, Starting from 9(10)-Dehydronandrolone (DHN), with Trifluoroacetic Acid

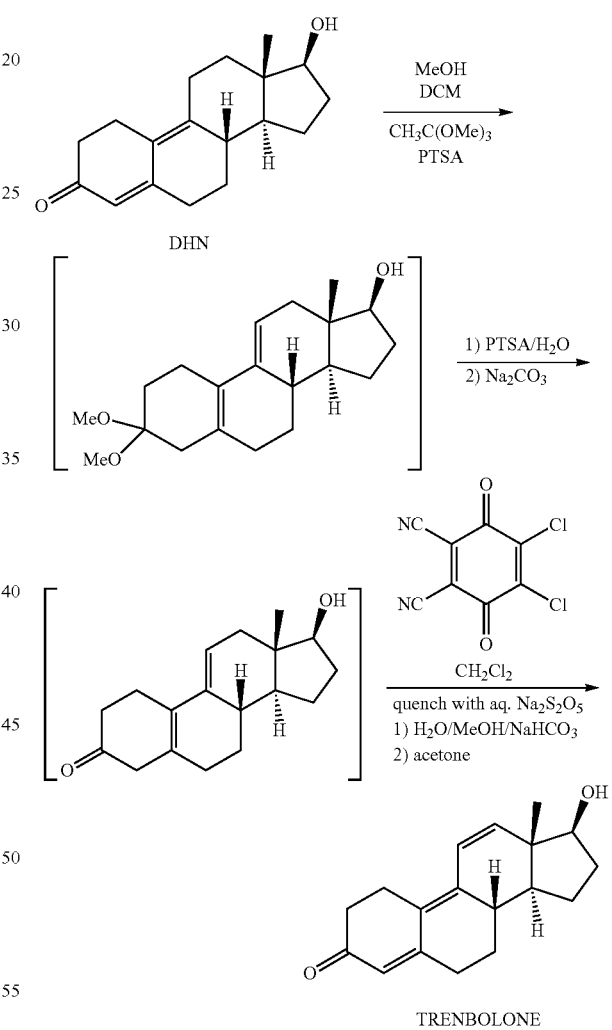

To a solution of 100 g DHN in 250 mL DCM, 50 mL MeOH and 1.4 g of PTSA is added dropwise over the course of at least 2 h to a stirred solution of 100 mL DCM, 350 mL MeOH and 60.7 mL trimethyl orthoacetate. At the end of the addition, the addition funnel is rinsed with 33.3 mL DCM and the rinse transferred into the reaction mixture. After IPC analysis showing reaction completion, to the mixture was added 500 mL of water and left stirring for 0.5-2 h. The aqueous phase is discarded and to the organic phase is added a mixture of 400 mL water and 5 g PTSA. After IPC analysis showing reaction completion, the biphasic mixture is separated, and the organic phase is neutralized by addition under stirring at r.t. of a solution of water (100 mL) and NaHCO$_3$ (0.2 g), which brings the pH at 7-8. The phases are separated, and to the organic phase are added 200 mL DCM. The obtained solution is concentrated under vacuum to around 200 mL (total volume) by keeping the internal temperature below 30° C. This addition/concentration protocol is repeated until the solution is anhydrous. After reaching this limit, the mixture is evaporated one last time until the total volume reaches 300 mL. The mixture is treated with 24.1 mL of trifluoroacetic acid and added dropwise to a stirred suspension of 95.8 g DDQ in 700 mL DCM, maintaining the internal temperature between 0-7° C. After the end of the addition, the addition vessel is rinsed with 50 mL DCM and the rinse is combined with the reaction mixture, which is left stirring at 0-7° C. until reaching complete conversion by HPLC. The reaction mixture is quenched by addition at 0-7° C. of a solution composed of 38.2 g of aqueous Na$_2$S$_2$O$_5$ (30% by weight), 73 mL water and 20 mL MeOH. The obtained slurry is warmed to r.t., left stirring for 0.5 h after which it is filtered, and the filter cake is washed with 2×100 mL DCM. The obtained biphasic mixture is separated, and the organic phase washed with a solution of 200 mL water, 20 mL MeOH and 7.7 g of NaHCO$_3$. After phase separation, the organic layer is washed again with a solution of 200 mL water, 60 mL MeOH and 7.7 g of NaHCO$_3$. The phases are separated, and the organic layer washed one final time with a solution of 200 mL water, 100 mL MeOH and 7.7 g NaHCO$_3$. The combined, filtered solution is concentrated with stirring to 300 mL (total volume) under vacuum, keeping the internal temperature below 30° C. To the resulting solution, 300 mL of acetone are added, and the obtained mixture concentrated under vacuum to 300 mL (total volume) again, keeping the internal temperature below 30° C. The resulting suspension is cooled to 0° C. and kept at this temperature for 0.5 h with stirring, after which it is filtered, and the filter cake is washed twice with 100 mL acetone. The wet solid is dried at 40° C. max under vacuum to give Trenbolone in 70% yield and >99.0% A/A purity by HPLC.

Example 6: Preparation of Trenbolone Acetate (i.e Compound (I-a)), by Acetylation of Compound of Formula (I-b)

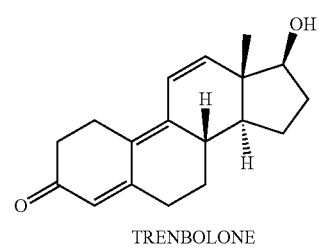

TRENBOLONE

1) Ac$_2$O, DMAP, DCM
2) aq. NaHCO$_3$

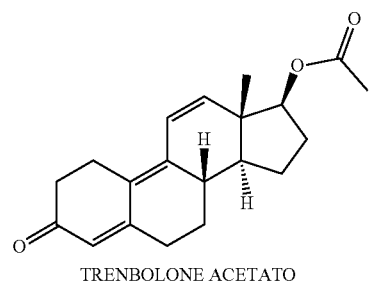

TRENBOLONE ACETATO

To a stirred mixture of 25 g Trenbolone and 0.3 g 4-DMAP in 187.5 mL DCM are added a total of 30 g of acetic anhydride and the obtained solution is stirred at 20° C. After residual Trenbolone is below 0.5% A/A by HPLC, the solution is treated with a solution of 31.1 g NaHCO$_3$ in 250 mL water with stirring. The aqueous layer is discarded, and the organic layer is washed with 125 mL water. After phase separation, the pooled aqueous washes are re-extracted with 125 mL DCM. The organic phases are combined and concentrated under vacuum by keeping the internal temperature below 30° C. To the obtained solution is added diisopropyl ether (125 mL) and the mixture is concentrated under vacuum to 100 mL (total volume), with the internal temperature kept at 30° C. To the mixture is added diisopropyl ether (100 mL) again, and the solvent distilled under vacuum to 100 mL (total volume) by keeping the internal temperature at 30° C. This addition/concentration protocol is repeated until residual DCM is below 1% w/w by GC analysis. The mixture is cooled to −15° C. and cold diisopropyl ether is added dropwise (100 mL). The solution is seeded with 0.5 g Trenbolone acetate at an internal temperature of −15° C. The mixture is left at −15° C. for 8 h, after which it is filtered. The filter cake is washed with 25 mL of cold diisopropyl ether and dried at 40° C. under vacuum to give Trenbolone acetate in 69% Yield and >99.0% A/a by HPLC.

Example 7: Preparation of Compound of Formula (I) Wherein R is Ac (i.e. Compound (I-a), Trenbolone Acetate), Starting from Compound of Formula (II) Wherein R is Ac (i.e. Compound (II-a)), with Acetic Acid

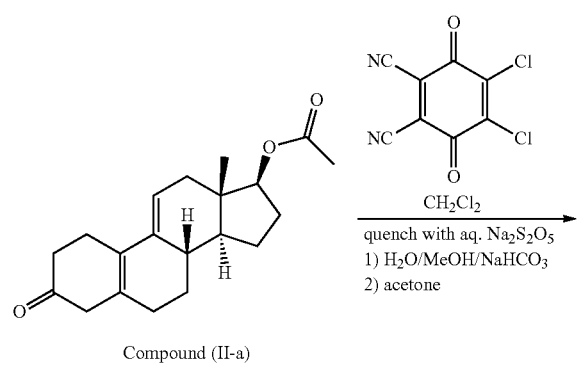

Compound (II-a)

CH$_2$Cl$_2$
quench with aq. Na$_2$S$_2$O$_5$
1) H$_2$O/MeOH/NaHCO$_3$
2) acetone

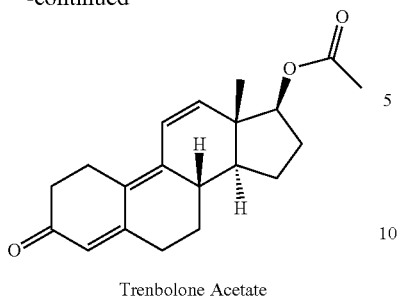

Trenbolone Acetate

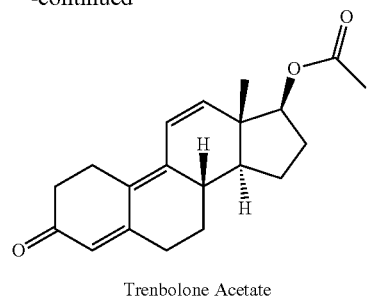

Trenbolone Acetate

To a cold mixture of 36 g DDQ in 350 mL anhydrous DCM, a solution of 50 g compound (II-a) and 9.5 gr acetic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of $Na_2S_2O_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of $NaHCO_3$. The phases are separated, and the organic layer washed one final time with a solution of 100 mL water, 10 mL MeOH and 3.9 g of $NaHCO_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated 3 times. The resulting suspension is cooled to 0° C. and kept at this temperature for 0.5 h with stirring, after which it is filtered, and the filter cake is washed twice with 50 mL cold acetone. The wet solid is dried at 40° C. under vacuum to give Trenbolone acetate in 78% yield and more then 98.0% A/A purity by HPLC.

Example 8: Preparation of Compound of Formula (I) Wherein R is Ac (i.e. Compound (I-a), Trenbolone Acetate), Starting from Compound of Formula (II) Wherein R is Ac (i.e. Compound (II-a)), with Trifluoroacetic Acid To a cold mixture of 36 g DDQ in 350 mL anhydrous DCM, a solution of 50 g compound (II) and 12 mL trifluoroacetic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of $Na_2S_2O_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of $NaHCO_3$. The phases are separated, and the organic layer washed one final time with a solution of 100 mL water, 10 mL MeOH and 3.9 g of $NaHCO_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated 3 times analysis. The resulting suspension is cooled to 0° C. and stirring at this temperature for 0.5 h, after which it is filtered, and the filter cake is washed with 50 mL acetone. The wet solid is dried at 40° C. under vacuum to give Trenbolone Acetate in 82% yield and more then 99.0% A/A purity by HPLC.

Example 9: Preparation of Compound of Formula (I) Wherein R is Ac (i.e. Compound (I-a), Trenbolone Acetate), Starting from Compound of Formula (II) Wherein R is Ac (i.e. Compound (II-a)), with Methanesulfonic Acid

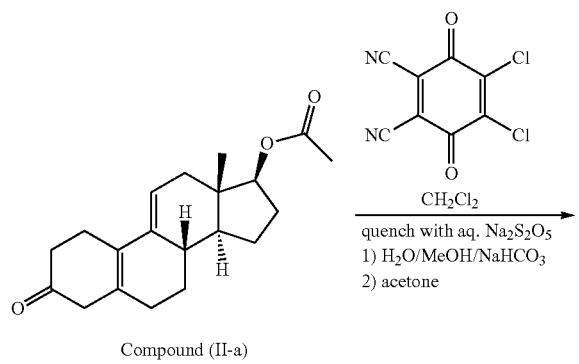

Compound (II-a)

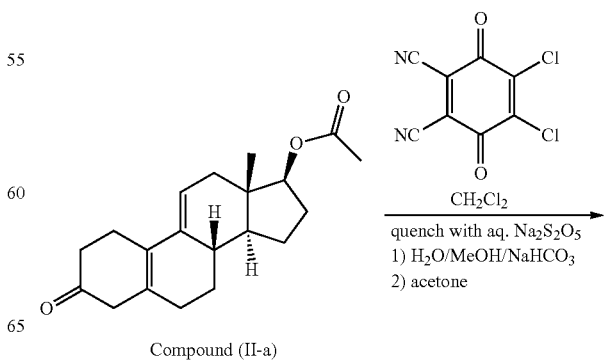

Compound (II-a)

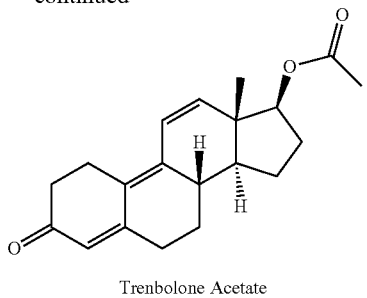

Trenbolone Acetate

To a cold mixture of 36 g DDQ in 350 mL anhydrous DCM, a solution of 50 g compound (II) and 10.3 mL methanesulfonic acid in 150 mL anhydrous DCM is added dropwise under stirring, while keeping the internal temperature at −5° C. The addition funnel is rinsed with 25 mL DCM and this aliquot is added to the reaction mixture. After 4 hours, reaction conversion reaches 99.25% by HPLC. The reaction mixture is quenched by addition of a solution composed of 5.7 g of $Na_2S_2O_5$, 50 mL water and 10 mL MeOH. The obtained slurry is warmed to 15-23° C. and left stirring for 0.5 h, after which it was filtered. The filter cake is washed with 2×40 mL DCM and the solid discarded. The obtained biphasic mixture is separated, and the organic phase washed twice with a solution of 100 mL water, 10 mL MeOH and 3.9 g of $NaHCO_3$. The phases are separated, and the organic layer washed one final time with a solution of 100 mL water, 10 mL MeOH and 3.9 g of $NaHCO_3$. The combined solution is concentrated with stirring to 150 mL (total volume) under vacuum, keeping the internal temperature below 30° C. To the resulting solution, 150 mL of acetone are added, and the obtained mixture concentrated under vacuum to 150 mL (total volume) again, keeping the internal temperature below 30° C. This addition/concentration protocol is repeated 3 times. The resulting suspension is cooled to 0° C. and kept at this temperature for 0.5 h with stirring, after which it is filtered, and the filter cake is washed twice with 50 mL cold acetone. The wet solid is dried at 40° C. under vacuum to give Trenbolone acetate in 72% yield and more then 98.0% A/A purity by HPLC.

Example 10

Karl Fischer analyses were recorded with a Metrohm 787 KF Trinito. The product was dissolved in MeOH. Two samples were analyzed using the following reactants: Hydranal-Composite 5 (Riedel de Haën Ref. 34805), Hydranal Methanol Rapid (Riedel de Haën Ref. 37817) and Hydranal Water Standard 1.0 (Riedel de Haën Ref. 34828 used to calculate the factor).

The water content in the oxidation reaction mixture prepared in examples 1, 2, 3, 4, 5, 6 is 0.10%, typically the KF of the oxidation reaction mixture is between 0.05% to 0.20%.

Example 11: Analytical Method to Identify and Quantify of Compound of Formula (I) and (II), Moreover for Determining the Chemical Purity, Via HPLC Colum: Poroshell EC120 C18, 150×4.6 mm, 2.7 μm, or equivalent;
Temp. Column: 45° C.;
Mobile Phase A: Milli Q Water+0.02% v/v $H_3PO_4$;
Mobile Phase B: Acetonitrile/Methanol 75:25 v:v;
Gradient

| Time (min) | % A | % B |
|---|---|---|
| 0 | 80 | 20 |
| 2 | 80 | 20 |
| 7 | 60 | 40 |
| 18 | 60 | 40 |
| 33 | 0 | 100 |
| 42 | 0 | 100 |
| 45 | 80 | 20 |
| 50 | 80 | 20 |

Flow: 1.0 mL/min;
UV Detector: 229 nm;
Injection Volume: 5 μL;
Analysis Time: 45 min;
Diluent: ACN:Methanol:Milli Q Water (34:33:33 v:v:v)+0.02% v/v $H_3PO_4$.

Example 12: Analytical Method to for the Conversion of the Oxidation Reaction from Compound of Formula (II) to Compound of Formula (I), Via HPLC Colum: Kinetex EVO C18 100A, 150×4.6 mm, 2.6 μm, or equivalent;
Temp. Column: 25° C.;
Mobile Phase A: Milli Q Water;
Mobile Phase B: Acetonitrile;
Gradient

| Time (min) | % A | % B |
|---|---|---|
| 0 | 80 | 20 |
| 2 | 80 | 20 |
| 17 | 0 | 100 |
| 27 | 0 | 100 |
| 27.1 | 80 | 20 |
| 32 | 80 | 20 |

Flow: 1.0 mL/min;
UV Detector: 229 nm;
Injection Volume: 5 μL;
Analysis Time: 27 min;
Diluent: Acetonitrile+0.075% v/v Triethylamine

The invention claimed is:
1. A process for the preparation of compound of formula (I):

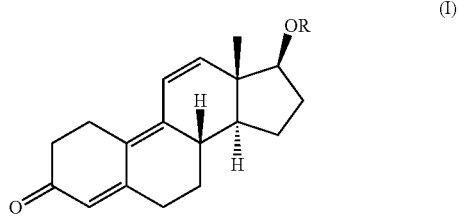

wherein R is H or Ac;
comprising reacting a compound of formula (II):

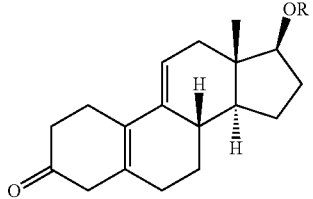
(II)

wherein R is H or Ac;
with an oxidant agent in an organic solvent, wherein the reaction is performed in presence of a acid.

2. The process according to claim 1, wherein the acid is selected from a carboxylic acid, inorganic acid, or sulphonic acid.

3. The process according to claim 1, wherein the acid is acetic acid or trifluoroacetic acid.

4. The process according to claim 3, wherein the amount of acetic acid or trifluoroacetic acid is between 0.5 and 1.5 molecular equivalents.

5. The process according to claim 1, wherein the organic solvent is methylene chloride.

6. The process according to claim 5, wherein the amount of methylene chloride is in the range from 5 to 15 volumes.

7. The process according to claim 4, wherein the amount of acetic acid or trifluoroacetic acid is about 1 molecular equivalents, the solvent is methylene chloride and the amount of methylene chloride is about 10 volumes.

8. The process according to claim 1, wherein the concentration of water in the oxidation reaction mixture is lower than 2000 ppm of water or lower than 1000 ppm of water.

9. The process according to claim 1, wherein the amount of oxidizing agent is in the range from 0.5 to 1.5 molecular equivalents.

10. The process according to claim 1, wherein the oxidizing agent is 2,3-Dichloro-5,6-dicyano-1,4-benzoquinone.

11. The process according to claim 3, wherein the amount of acetic acid or trifluoroacetic acid is in the range from 0.8 and 1.2 molecular equivalents and the oxidizing agent is 2,3-Dichloro-5,6-dicyano-1,4-benzoquinone present in the range from 1 and 1.2 molecular equivalents.

12. The process according to claim 1, further comprising the step of preparing the compound of formula (III):

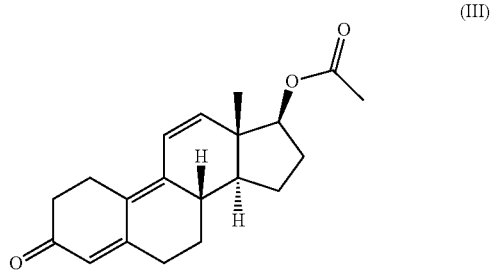
(III)

by acylating the compound of formula (I), wherein R is H.

13. The process according to the claim 12 wherein the steps are carried out one-pot.

* * * * *